Sheet 1-2 Sheets.

H. Waterman.

Mower.

№ 4251 Reissued Jan. 31, 1871.

Sheet 2-2 Sheets.

H. Waterman.

Mower

No. 4251 Reissued Jan. 31, 1871.

United States Patent Office.

HENRY WATERMAN, OF WILLIAMSBURG, NEW YORK.

Letters Patent No. 13,512, dated August 28, 1855; extended seven years; reissue No. 4,251, dated January 31, 1871.

IMPROVEMENT IN HARVESTERS.

The Schedule referred to in these Letters Patent and making part of the same.

*To all whom it may concern:*

Be it known that I, HENRY WATERMAN, of Williamsburg, in the county of Kings and State of New York, have invented an Improvement in Machines for Reaping and Mowing; and I do hereby declare that the following is a full, clear, and exact description thereof, reference being had to the accompanying drawing making part of this specification, in which—

Figure 1:
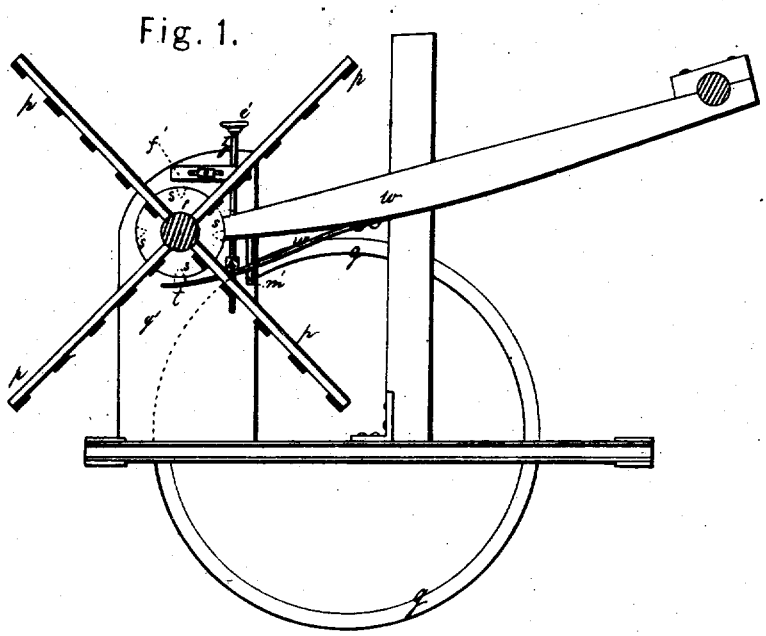
Figure 1 represents a section taken vertically through the center of the machine.
Figure 3:
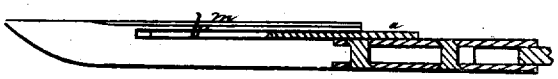
Figure 3 is one of the fingers, showing the knife in section.
Figure 4:
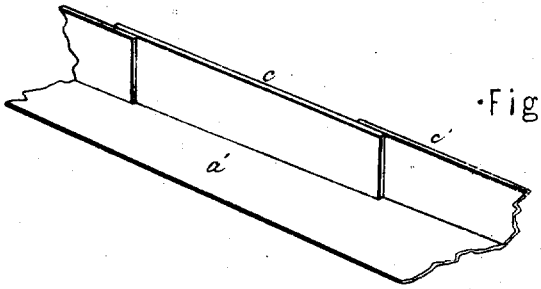
Figure 4 is a detached view of the flexible deflector.
Figure 2:
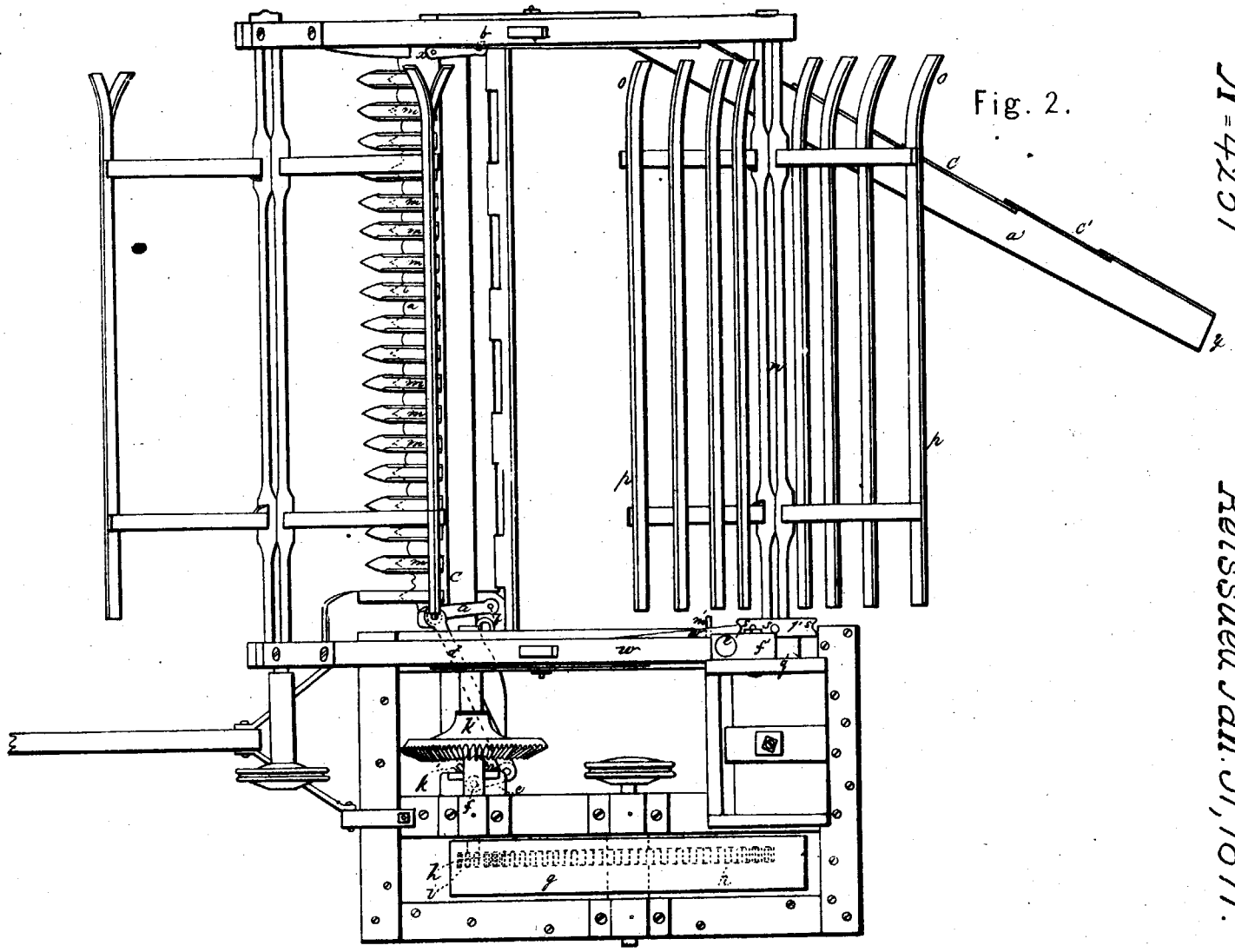
Figure 2 is a plan of the machine.

My invention consists in certain improvements in machines for reaping and mowing, whereby the cutting is facilitated and clogging prevented, and the grain collected and deposited in proper quantities at suitable intervals, and in its proper position on the field.

The difficulty of cutting wet grass by mowing-machines is well known, and it arises not only from the difficulty of making the cut, but from the "gumming" and clogging of the knives.

To obviate these difficulties, I give an advancing and retreating curvilinear motion to the knives, as follows:

The cutter-bar is connected at each end by pivot-joints to the arms *a a*, which vibrate about the fixed centers *b b*.

The end *c* of the cutter-bar is attached by a pivot-joint to the connecting-rod *d*, which takes hold of the bell-crank *e* upon the pinion-shaft *f*, which last receives its motion from the main driving-wheel *g*, through the medium of the inner gear *h*, pinion *i*, and bevel-gear *k k'*.

From this mode of attaching and operating the cutter-bar, it will be seen that it, with its knives, has an advancing and retreating curvilinear motion, which secures the advantage of a "draw-cut," and is the motion best suited to clear the spaces between the knives and the fingers. The range of motion being greater than in the straight reciprocating cut, I adapt the cutting and clearing-edges of the knives to their proper action by using two sets of knives or cutting-edges, viz., the projecting knives *b b* and the intermediate knives or edges *a a*.

Both these knives perform the offices of cutting and clearing, and while the cut is effected with more ease than with the usual rectilinear motion of the cutter-bar, the clearing is effected in a very perfect manner.

The knives may be made in any of the well-known forms not inconsistent with my pecular action, and the fingers *m m*, &c., I make elastic, instead of making them firm and unyielding, as they are usually from being made of cast-iron.

A twofold purpose is thus accomplished by the elastic fingers, viz., when sticks or any obstructing material get between the fingers and knives, the spring of the fingers admits of its being easily dragged out by the retracting motion of the knife.

For the purpose of depositing the grain on the ground in given quantities, the grain, as it is cut and delivered by the reel falls upon a cradle, and when the required quantity has been collected, the cradle is liberated to drop its load of grain, and as this is being delivered, the grain which is being cut is caught and held by an interposed cradle.

The mode of construction in which this mode of operation is embodied, consists of four cradles, *p p p p*, composed each of a series of parallel bars, attached to arms projecting from a shaft, *n*, mounted to turn in suitable bearings, as represented in the accompanying drawing.

Near one end of the shaft *n* there is a count-wheel, *r*, having four holes *s* in its periphery, at equal distances apart, to receive a check-pin, *t*, on a spring, *u*, and the holes for the check-pin are so located relatively to the cradles as to hold any one of them in the required position to receive the grain when cut and thrown back by the reel operating in the usual way.

Near the seat of the driver, so as to be easily reached and operated by him, there is a handle, *e'*, on the end of a sliding rod, *z*, by means of which, so soon as a sufficient quantity of grain for a gavel, has been collected on the cradle, the driver can depress the spring *u*, and thereby disengage the check-pin from one of the holes in the count-wheel, so that the weight of the grain which has accumulated on the cradle may turn it, and be discharged, and in so doing the next cradle is brought in line and stopped by the check-pin entering the next hole in the count-wheel. In this way, the discharge of one gavel brings into position another cradle, to catch the next cut grain, to be in turn discharged in like manner.

As the grain is laid across the swath, it is turned so as to lie in the direction of the swath and be out of the way of the horses at the next cut, by means of a deflector of a peculiar description. This deflector *y* is attached to the rear end of the guard or side-board, and is made of a flexible strip, *a'*, of metal or other suitable material, and a deflecting side, *b'*. This side is composed of sections *c' c'*, &c., attached by their lower edges to the strip *a'*, and having their vertical edges overlapping each other and free, so as to admit of the flexure of the strip *a'*, as it passes over irregularities and obstructions upon the surface of the field.

I do not claim the advancing and retreating curvilinear motion of the cutter-bar, but

I claim—

1. The combination of the two sets of knives described, with the cutter-bar having a curvilinear motion, as set forth.

2. The shifting-cradles, substantially as described, mounted on the frame or platform of a reaping-machine and placed across it, so as to be parallel, or nearly so, with the cutter-bar, and so arranged, as described, that when one of them is liberated to discharge a gavel of grain, another shall take its place to catch the grain that is next to be cut, as set forth.

3. The flexible deflector, constructed and operating as set forth.

HENRY WATERMAN.

Witnesses:

T. B. BEECHER,

WM. H. BISHOP.